PHONOGRAPH PICKUP

Filed Dec. 11, 1962

INVENTOR.
Clarence F. Jensen,
BY Donald L. Welsh
Attorney.

United States Patent Office 3,227,460
Patented Jan. 4, 1966

3,227,460
PHONOGRAPH PICKUP

Clarence F. Jensen, Lombard, Ill., assignor to Jensen Industries, Inc.

Filed Dec. 11, 1962, Ser. No. 243,913
7 Claims. (Cl. 274—25)

The present invention relates generally to phonograph pickups of the electro-mechanical type especially adapted for use with stereophonic records and having two piezo-electric transducer elements generating separate signals in response to movements of a single record engaging stylus. More particularly, the invention relates to pickups in which the transducers are formed of a material such as crystal, for example, Rochelle salt, of elongated flat rectangular shape each adapted to generate a voltage in response to twisting movements about a longitudinal axis of the element. As is well known in the art, the groove of a stereophonic record is of V-shape and the respective walls vary in depth in accordance with changes in the recorded sounds and exert on the stylus a resultant or combination of vertical and lateral or horizontal forces varying with the depths of the individual walls. This is to be distinguished from monaural records in which the force on the stylus is exerted only in a lateral or horizontal direction.

The primary object of the present invention is to provide a novel pickup of the above character utilizing crystal transducer elements of the so-called twister type in which the electric signal is generated in response to longitudinal twisting of one end of the element with respect to the other and which are of lower cost than other types of transducer elements.

Another object is to provide a pickup using crystal twister elements arranged in a novel manner to accommodate both monaural and stereophonic records.

Still another object is to transmit the stereophonic forces on the stylus to the twister elements in a novel manner enabling the elements to be arranged side by side in parallel relation and thereby occupy a small space.

A still further object is to transmit stylus forces to the elements through a yoke which is constructed in a novel manner to achieve the parallel relation of the elements and adapt the same for use with separate styli to achieve large signals with either monaural or stereophonic record grooves.

A more detailed object is to support the elements in cantilever fashion with the yoke coupling their free ends and constructed in a novel manner to transmit to the individual elements different forces depending on the resultant forces on the stylus in the case of stereophonic operation and to transmit only lateral forces of large magnitude to the elements during monaural operation.

A further detailed object is to provide a yoke having individual force transmitting members in the coupling between the stereophonic stylus and the respective transducer elements.

Other objects and advantages of the invention will become apparent from the following detailed description taken in connection with the accompanying drawings, in which.

Figures 1, 2, 3, 4, 5, 6, 7, 8, 9, 10:
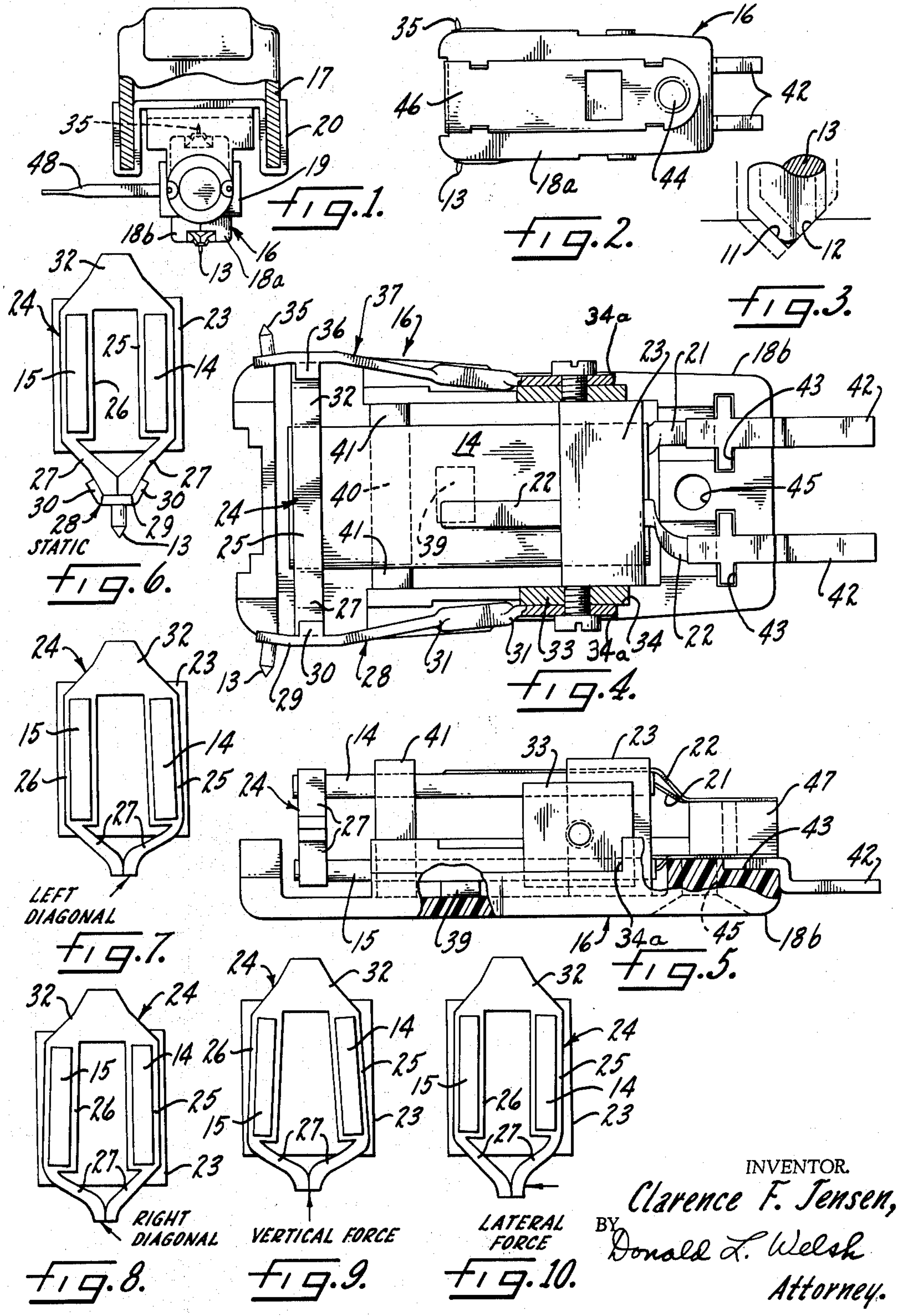
FIGURE 1 is an end elevational view of a cartridge embodying the novel features of the present invention and mounted on a pickup arm, a portion of which is broken away and shown in section.
FIG. 2 is a side elevational view of the cartridge.
FIG. 3 is a schematic sectional view showing a stylus in a stereophonic record groove.
FIG. 4 is an enlarged view similar to FIG. 2 with a part of the cartridge housing removed and some of the parts shown in section along a center dividing plane of the cartridge.
FIG. 5 is a side edge elevational view of the cartridge as shown in FIG. 4 with part of the casing and the stylus holder removed and with other parts broken away and shown in section.
FIGS. 6, 7, 8, 9 and 10 are schematic end views of the transducer elements and their connecting yoke showing different positions of the elements corresponding to different types of resultant forces transmitted to the elements from the sterephonic stylus.

In the drawings, the invention is shown for purposes of illustration embodied in a phonographic pickup which is especially adapted for use with a stereophonic record. In such a record, the groove, as illustrated schematically in FIG. 3, is of V-shape with two upwardly facing diagonal walls 11 and 12 adapted to be engaged by a stylus 13 with a rounded point and to exert thereon forces varying with the depth of the respective walls, that is, changes in the position of each wall in a direction normal to its surface. The depths of the respective walls vary with individual audio frequency signals which are reproduced separately and are combined in the listening area to simulate different sources of sound. Whereas so-called monaural record grooves cause a stylus to move laterally or sideways with respect to the groove, the forces exerted on the stylus by the stereophonic groove walls produce a resultant or combination of lateral or horizontal movement and movement vertically, that is, toward and away from the record.

Referring to FIG. 3, the normal or static position of the stylus 13 with respect to a reference or unmodulated groove is illustrated in full lines. Assuming that the left diagonal wall 11 decreases in depth, that is, shifts upwardly to the right, while the right diagonal wall 12 remains the same, the stylus also shifts upwardly and to the right to the position shown in dotted lines. Conversely, if the left diagonal wall increases in depth while the depth of the right wall remains unchanged, the stylus shifts downwardly and to the left to the position indicated by the dot-dash lines in FIG. 3. When both walls change, the stylus shifts in a lateral or vertical direction and by an amount corresponding to the combined or resultant motion due to changes in the individual walls.

The resultant movement of the stylus 13 due to changes in the stereophonic groove walls 11 and 12 is transmitted to two transducer elements 14 and 15 of the electro-mechanical type which generate separate electrical signals corresponding to the undulations of the respective walls. These signals then are amplified and transmitted to individual loudspeaker units (not shown). Preferably the transducer elements are parts of a cartridge 16 which is mounted on the tone arm 17 of the pickup for easy replacement. In the present instance, the cartridge comprises a casing 18*a*, 18*b* of generally rectangular shape enclosing the elements and fitting releasably between the legs of a U-shaped clip 19 which is mounted on the tone arm through the medium of a bracket 20. The construction of the clip and bracket are shown and described more fully in my co-pending application, Serial No. 166,878, filed January 17, 1962, now abandoned. To facilitate manufacture and assembly, the casing is divided into two hollow parts 18*a* and 18*b* which abut each other along a central dividing plane.

Transducer elements of the electro-mechanical type generally are divided into two groups, ceramic and crystal. In one type of crystal element which is of flat elongated rectangular shape, two slabs of crystal are secured together in back-to-back relation with their large flat sides opposing each other and in contact. With this arrangement, a voltage is generated in response to twisting of one end of the element relative to the other about a longitudinal axis of the element. Elements of this type commonly called "twisters" and formed of Rochelle salt crystals are manufactured and sold by Brush-Clevite Company of Cleveland, Ohio, under the trade name "Bimorph." This type of element has been found to be less expensive than other types of transducers such as the ceramic type which respond primarily to bending. In the present instance, the voltage generated by each element appears across two flat conductor strips 21 and 22, one extending between and connected to the opposed contacting sides of the slabs and the other connected to the outwardly facing side of one slab (FIGS. 4 and 5).

In accordance with the present invention, the transducer elements 14 and 15 are supported in the casing 18*a*, 18*b* and are connected to the stylus 13 in a novel manner permitting the use of twister elements and thereby reducing the cost of the cartridge while requiring a small space so as to keep the size of the cartridge 16 small. To these ends, three corners of each element are retained in relatively fixed relation and the resultant forces in the stereophonic stylus are separated into two components. These components vary with changes in the depths of the respective groove walls 11 and 12 and are transmitted individually to the fourth corners of the elements, to shift these laterally of the elements and relative to the three fixed corners thereby achieving the desired twisting of the elements.

The relatively fixed relation of the two corners at one end of each of the transducer elements 14 and 15 is maintained by securing these ends in a yieldable mounting block 23 of rectangular shape, the elements extending from the block in cantilever fashion and in closely spaced parallel relation. At their free ends, the elements are connected to the stereophonic stylus 13 by a yoke 24 which maintains the third corners of the elements in their desired fixed relation and, also, separates and applies to the respective fourth corners of the elements the different twisting force components of the resultant forces exerted on the stylus by the diagonal groove walls. The yoke is of generally rectangular shape with two parallel side members 25 and 26 telescoping over and secured to the respective free end portions of the transducer elements and connected at their upper and lower ends as viewed in the drawings by cross members 27 and 32 integral with the side members.

To maintain the fixed relation of the upper corners of the free ends of the transducer elements 14 and 15 and the corners of the fixed ends adjacent the yieldable mounting block 23, the upper cross member 32 of the yoke 24 is of substantial thickness and cross section so as to provide a stiff connection. In the present instance, this cross member is of generally triangular shape, symmetrical about a central plane paralleling and spaced equidistantly from the elements.

The desired separation of the resultant stereophonic stylus forces into its two components and the individual application of these to the movable corners of the transducer elements is achieved by a novel construction of the lower cross member of the yoke. This member thus is formed in two sections 27 which converge downwardly and into engagement with each other from the respective side members 25 and 26 of the yoke. The cross sectional areas of the two sections at their points of connection with the side members are small so as to form, in effect, pivotal connections permitting flexing of the sections with respect to the side members 25 and 26 generally in the plane of the yoke and about axes extending longitudinally of the elements. With this arrangement, forces acting on the stylus in a direction along each section of the lower cross member are transmitted to the lower corner of the associated element but forces in a direction transverse to the section result simply in bending of the section in the plane of the yoke without transmitting any twisting force to the element. To render the forces acting longitudinally of each section most effective to twist the associated element, the section is connected to the lower end of its side member adjacent the outer side of the member. This provides a long movement arm for the force on the movable corner with respect to the upper edge of each element about which the element twists.

Forces exerted on the stereophonic stylus are transmitted to the lower cross member sections 27 of the yoke 24 by a holder 28 of generally U-shaped cross section. A closed end 29 of the U engages the extreme downwardly facing ends of the section and spaced upstanding legs 30 of the holder straddle the sections and engage outwardly facing sides of the sections (FIG. 6). In this instance, the bottom 29 of the U is a part of a flat elongated strip of metal which is secured at one end to the casing and projects therefrom in cantilever fashion with its end adjacent the U extending beyond the U and carrying the stylus. Laterally projecting ears bent up from the strip at a point spaced a short distance from the stylus form the spaced legs 30 of the U. For universal compliance, the strip is twisted twice at spaced points as indicated at 31 adjacent the anchored end of the strip. Herein, such end is anchored by a screw to a flat block 33 of metal which is clamped between the element supporting block 23 and an interiorly facing wall 34 of the casing (FIG. 4), the screw extending through a hole 34*a* in the casing and the holder extending along the exterior of the housing.

The holder strip 29 is biased so that the U-shaped portion is urged inwardly into engagement with the outer end portions of the lower cross member sections 27 which extend outwardly through an aperture in the housing 18*b*. With this bias and in a static condition when no force is exerted on the stylus by the record groove, the free ends of the transducer elements 14 and 15 are parallel with each other and with the side edges of the cantilever supporting block 23. This condition is illustrated in FIG. 6 which is a schematic view looking toward the free ends of the transducer elements. The positions of the free ends of the transducer elements with various resultant stylus forces are illustrated in FIGS. 7 through 10.

When the direction of the resultant force exerted on the stylus 13 is upwardly and to the right as indicated by the arrow in FIG. 7 or downwardly and to the left, a condition existing when only the left groove wall 11 is modulated and the right groove wall 12 is unmodulated, the free end of only the right element 14 is twisted out of parallelism with the other end of the same element, and the other element remains in its static condition. Such selective twisting is believed to be due to the thin flexible character of the yoke sections 27 and their connections to the outer edge of the side members. The diagonal force acting along the right section 27 is transmitted thereby to its element 14, but serves to swing the left section 27 about its connection with its side member 26 so that little twisting force is transmitted to the left element.

Correspondingly, modulation of only the right groove wall 12 with no modulation of the left groove wall 11 will produce a resultant force in an upward direction and to the left as indicated by the arrow in FIG. 8 or in a downward direction and to the right and only the left element will be twisted out of its static position. Such a force which is transverse to the right section 27 tends to swing that section about its connection with its side member 25 so that little twisting force is transmitted to the right element. When both groove walls are modulated equal amounts, the resultant force is vertical as indicated by the arrow in FIG. 9 and the free ends of both elements are twisted equal amounts but in opposite directions as shown in this figure. If the resultant force is lateral or horizontal as indicated by the arrow in FIG. 10, both elements tend to twist but in the same direction. Resultant forces in other directions and other amounts will produce twisting movements of the respective elements corresponding to the components of the resultant force which vary with the modulations of the individual walls. It will be seen that, in the various positions of the elements, their upper corners of their free ends retain substantially the same spacing as determined by the upper cross member 32 and remain substantially fixed with respect to the corners within the mounting block 33.

In addition to maintaining the spacing of two corners of the free ends of the transducer elements 14 and 15, the upper cross member 32 of the yoke 24 may be utilized to advantage with monaural records in achieving efficient transmission of the forces on a monaural stylus to either transducer element. As is well known, the forces exerted on a stylus by the walls of a monaural record groove act in a lateral direction, that is, cross-wise of the groove or horizontally in the case of flat records rotating about vertical axes. The upper cross member of the yoke, being relatively stiff, transmits such forces directly to the elements through the side members 25 and 26. To effect such transmission, a second stylus 35 is mounted on a second holder 37 which is of the same construction and mounting in the cartridge as the stereophonic stylus holder and includes spaced legs 36 straddling outwardly facing sides of the upper cross member at one of its corners, such corner being cut off to provide a flat surface engaging the bottom of the U between the legs. Monaural grooves being slightly larger than stereophoic grooves, the monaural stylus is made correspondingly larger than the stereophonic stylus.

In the present instance, the yoke 24 is formed of a yieldable material capable of absorbing energy and also having memory to achieve a damping effect while being less resilient than rubber. A suitable plastisol has been found to be satisfactory for this purpose. In assembling the parts, the side members 25 and 26 of the yoke are simply telescoped over and cemented to the free ends of the transducer elements 14 and 15. At their other ends, the elements similarly telescope within openings in the cantilever supporting block 23 and are cemented thereto. This block is formed of material similar to the yoke and, as indicated above, is clamped between the casing halves 18*a* and 18*b*, their being clearance around the yoke within the casing to permit free movement of the yoke and adjacent ends of the elements. Intermediate their ends, the elements are spaced from the casing walls by small spacer or snubbing blocks 39 secured to the inner sides of the respective casing halves and by a divider member 40 of yieldable material of I-shape extending between the elements and having end portions 41 disposed between the edges of elements and the casing walls. The spacer blocks and divider also effect some damping of the elements. The cartridge is completed by exterior electrical connecting posts 42 which are mounted in recesses 43 in the casing and are connected individually to the different conductors 21 and 22 for the elements, there being four such posts for the four conductors in the present instance.

In the assembly of the cartridge parts, the transducer elements 14 and 15 and their main supporting block 23, the yoke 24 and the separator 40 are assembled first and then are inserted with the stylus holders 28 and 37 and posts 42 in one of the casing halves 18*a* and 19*b* in which the spacer block 39 has been secured. Then the other half with its spacer block 39 and terminal posts 42 is assembled to the first half and the two are secured together by a rivet 44 extending through alined apertures 45 in the halves and also through an external metal strip 46 of U-shape extending along both sides of the assembled casing halves and across the end adjacent the styli. The inner end portions of the posts are retained in position in their respective recesses 43 by individual positioning blocks 47 of yieldable material of cross-shaped cross section clamped between the inner terminal end portions in the final assembly of the casing halves.

To enable either the stereophonic stylus 13 or the monaural stylus 35 to be located in a downwardly projecting operative position beneath the tone arm 17, the clip 19 whose legs straddle the casing 18*a*, 18*b* and the strip 46 of metal on the casing is mounted on the tone arm bracket 20 to rotate about a horizontal axis coincident with the longitudinal axis of the casing. A handle 48 rigid with the clip projects laterally therefrom to facilitate manipulation of the clip. As indicated earlier, the clip and bracket are disclosed in detail in my co-pending application, Serial No. 166,878, filed January 17, 1962.

It will be apparent that, being supported in parallel planes, the transducer elements 14 and 15 require little space. Such relation with twister type of transducer elements is made possible by the novel manner of supporting the elements each with relatively fixed corners and by the novel constrction of the lower yoke section 27 in two parts connected to the stereophonic stylus holder 28 so that resultant forces on the stereophonic stylus are separated into components and applied individually to the respective transducer elements. At the same time the elements are readily adapted for use with a monaural stylus by the more rigid construction of the upper cross member 32 so that the forces on the monaural stylus 28 produce movement of the transducer elements laterally in unison.

I claim:

1. In a phonograph pickup, the combination of a casing and a supporting body therein, a pair of flat elongated transducer elements projecting in parallel relation and in cantilever fashion from said body, a yoke of yieldable damping material supporting the free end portions of said elements and including two side members secured to the elements and lying in a transverse plane of the elements, a first cross member spanning and formed integral with said side members at one of their ends and maintaining the adjacent longitudinal edges of said elements spaced apart while permitting twisting of the elements about axes extending longitudinally of the elements, said first cross member having a central portion projecting longitudinally of and away from said side members and providing spaced surfaces facing laterally of the side members and in opposite directions away from each other, an elongated stylus holder secured at one end to said casing and extending longitudinally of said elements with its other end engaging said central portion of said cross member and providing spaced faces engaging said spaced surfaces on such portion for movement of the holder laterally with the portion to transmit to the elements undulations in a monaural record groove, a second cross member connecting the other ends of said side members and formed in two sections converging outwardly from the side members and toward each other and having free end portions engaging each other, and a second elongated stylus holder secured at one end to said casing and extending longitudinally of said elements with its other end of U-shape to provide opposed surfaces engaging opposite outwardly facing sides of said end portions of said sections of said second cross member to transmit through such portions and individually to said free end portions of said elements separate components of resultant forces exerted on a stylus in the holder by opposite walls of a stereophonic record groove.

2. In a phonograph pickup, the combination of, a casing and a supporting body therein, a pair of flat elongated transducer elements projecting in parallel relation and in cantilever fashion from said body, a yoke of yieldable damping material supporting the free end portions of said elements and comprising two side members secured to the elements and lying in a transverse plane of the elements, a first cross member spanning and formed integral with said side members at one of their ends and maintaining the adjacent edges of said elements spaced apart while permitting twisting of the elements about longitudinal axes, and a second cross member connecting the other ends of said side members and formed in two sections converging outwardly from the side members and downwardly toward each other and having free end portions engaging each other, and an elongated stylus holder secured at one end to said casing and extending longitudinally of said elements with a U-shaped part adjacent its other end to provide opposed surfaces engaging opposite outwardly facing sides of said end portions of said sections of said second cross member to transmit through such portions and individually to said free end portions of said elements separate components of resultant forces exerted on a stylus in the holder by opposite walls of a stereophonic record groove.

3. In a phonograph pickup, the combination of, a supporting body, a pair of flat elongated transducer elements projecting in the same direction and in cantilever fashion from said body, a yoke of yieldable damping material supporting the free end portions of said elements and including a cross member spanning corresponding longitudinal edges of the elements and formed in two sections, said sections converging from said element edges outwardly and into engagement with each other at their free ends, and a stylus holder engaging oppositely facing surfaces of said sections of said cross member to transmit through the sections and individually to said free end portions of said elements separate components of resultant forces exerted on a stylus in the holder by opposite sides of a stereophonic record groove.

4. In a phonograph pickup, the combination of a pair of flat elongated transducer elements, means supporting said elements in spaced side by side relation and maintaining three corresponding corners of each element relatively fixed while permitting lateral movement of the fourth corners, a stylus holder, and a yoke of yieldable damping material connecting said holder and the respective fourth corners of said elements and transmitting thereto individual components of resultant forces exerted on a stylus holder by the walls of a stereophonic record groove, said yoke including a cross member spanning said fourth corners of said elements and having two elongated laterally flexible sections converging outwardly from the fourth corners to a central portion of the cross member.

5. In a phonograph pickup, the combination of, a supporting body, a pair of flat elongated transducer elements projecting side by side in spaced side by side relation and in cantilever fashion from said body, a yoke of yieldable damping material supporting the free end portions of said elements and including two side members secured to the elements and lying in a transverse plane of the elements, a first cross member spanning and formed integral with said side members at one of their ends adjacent corresponding longitudinal edges of the elements, said cross member forming a rigid connection between said edges to maintain the spacing of the same substantially constant, a second cross member spanning and integral with said side members adjacent to other longitudinal edges of said elements and formed of two elongated sections converging outwardly from said side members toward and into engagement with each other at their free ends and having a relatively thin cross section permitting each section to flex in said plane upon the application to the section of a force transverse to the section and to transmit to the associated element a force lengthwise of the section, each of said sections being connected to the associated side member adjacent the outer side of such member and the adjacent element to provide a large moment arm for forces acting lengthwise of the section to twist the element about said corresponding longitudinal edge of the element, and a stylus holder engaging said sections to transmit individually to said elements separate components of resultant forces exerted on a stylus in the holder by opposite sides of a stereophonic record groove.

6. In a phonograph pickup, the combination of a supporting body, a pair of flat elongated transducer elements projecting side by side in spaced relation and in cantilever fashion from said body, a yoke of yieldable damping material supporting the free end portions of said elements and including two side members secured to the elements and lying in a plane transverse to the elements, a first cross member spanning and formed integral with said side members at one of their ends adjacent corresponding longitudinal edges of the elements, said cross member forming a rigid connection between said edges to maintain the spacing of the same substantially constant, a second cross member spanning and integral with said side members at the other longitudinal edges of said elements and formed of two elongated sections converging outwardly from said side members toward a central portion of the cross member and having a relatively thin cross section permitting each element to flex in said plane upon the application to the section of a force transverse to the section and to transmit to the associated element a force lengthwise of the section, each of said sections being connected to the associated side member adjacent the outer side of said member and the adjacent element to provide a large moment arm for forces acting lengthwise of the section to twist the element about said corresponding longitudinal edge of the element, and a stylus holder engaging said central portion of said second cross member to transmit individually to said elements separate components of resultant forces exerted on a stylus in the holder by opposite sides of a stereophonic record groove.

7. In a phonograph pickup, the combination of a supporting body, a pair of flat elongated transducer elements projecting side by side in spaced relation and in cantilever fashion from said body, a yoke of yieldable damping material connecting the free end portions of said elements and including two elongated tubular side members lying in a transverse plane of the elements and telescoping closely with said free end portion of the elements, a first cross member spanning and formed integral with said side members at one of their ends adjacent corresponding longitudinal edges of the elements, said cross member forming a rigid connection between said edges to maintain the spacing of the same substantially constant, a second cross member spanning and formed integral with said side members at the other longitudinal edges of said elements and formed of two thin elongated sections converging outwardly from such edges toward a central portion of the member, said sections being pivotally connected to the associated side member to transmit to the latter and to said other longitudinal edges of said elements forces directed lengthwise of the section and to swing in said transverse plane when a force is applied to the section in a direction transverse to the section, and a stylus holder engaging said central portion of said second cross member to transmit individually to said elements separate components of resultant forces exerted on a stylus in the holder by opposite sides of a stereophonic record groove.

References Cited by the Examiner

UNITED STATES PATENTS

| | | | |
|---|---|---|---|
| 2,997,548 | 8/1961 | De Vries | 179—100.41 |
| 3,056,861 | 10/1962 | Grover | 179—100.41 |
| 3,113,783 | 12/1963 | Zimmermann et al. | 179—100.41 |
| 3,117,190 | 1/1964 | Johnson | 179—100.41 |

OTHER REFERENCES

German application No. 1,119,533, published December 14, 1961.

NORTON ANSHER, *Primary Examiner.*